Nov. 25, 1958 N. M. FOSTER 2,861,772
PROPORTIONING FUEL-AIR VALVE
Filed Oct. 31, 1956
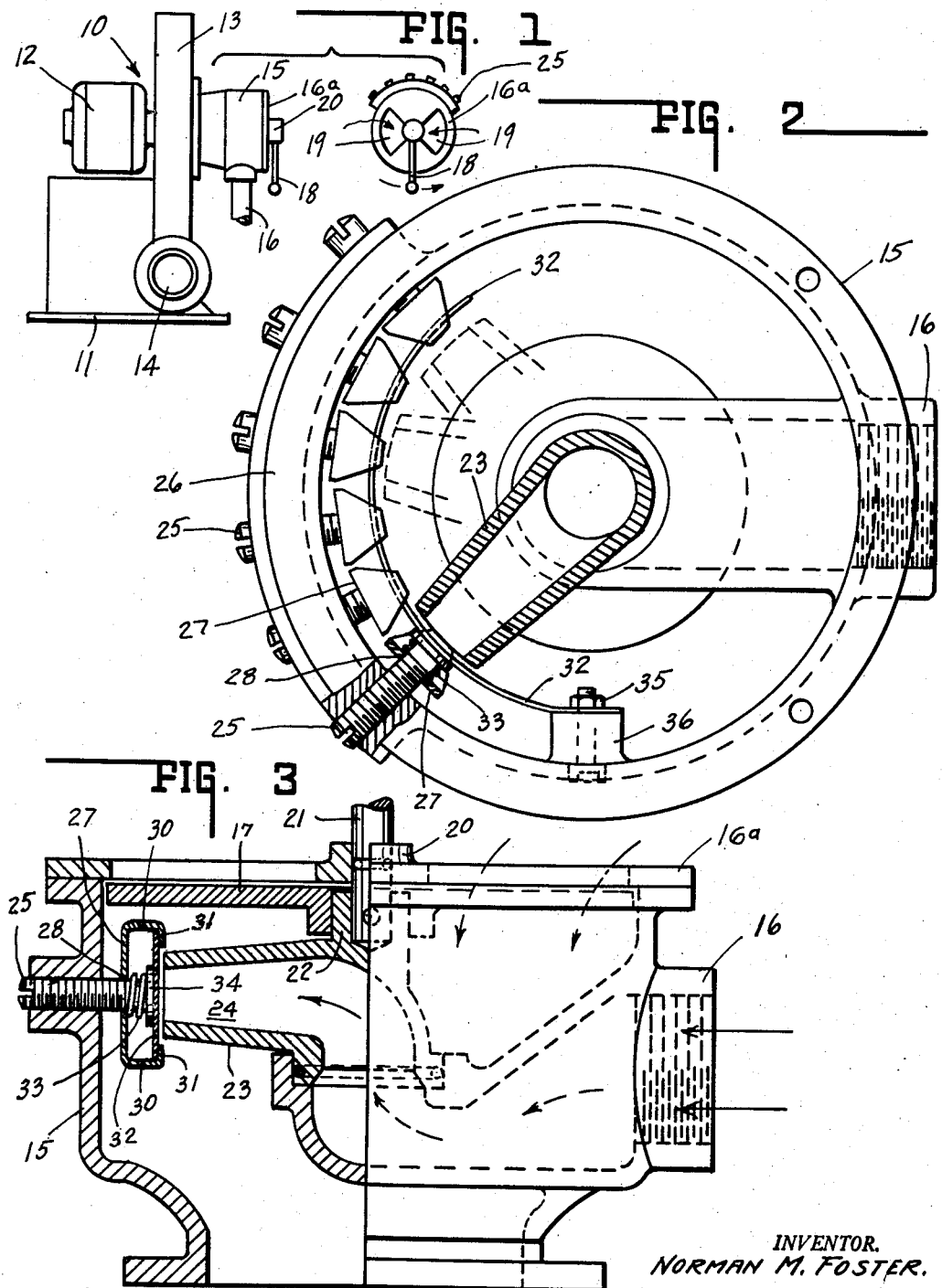
INVENTOR.
NORMAN M. FOSTER.
BY
Lockwood, Galt, Woodard & Smith
ATTORNEYS.

United States Patent Office 2,861,772
Patented Nov. 25, 1958

2,861,772

PROPORTIONING FUEL-AIR VALVE

Norman M. Foster, New Castle, Ind.

Application October 31, 1956, Serial No. 619,503

5 Claims. (Cl. 251—208)

This invention relates to a proportioning valve for use in positively controlling the ratio of gas to air so that the mixture fed to a burner will assure maximum efficiency of burner operation.

Heretofore the conventional valves in this art have been characterized by mechanism having certain moving or sliding parts which because of their frictional relationship have required a considerable amount of power to move. Furthermore, from time to time these moving parts are inclined to stick thereby reducing the effectiveness of the valve if not rendering it completely ineffective. Valves in this field have in some instances utilized springs which have had to have a certain degree of flexibility in order to yield to pressure and form a desired contour. However, being flexible, these springs have not always yielded in the desired manner. More particularly the area of such springs lying between the series of pressure exerting plungers or rods has tended to adopt a contour other than that desired, thereby rendering the entire valve inefficient and ineffective.

It is the primary object of the present invention to provide mechanism which overcomes the above-mentioned disadvantages and which positively and completely controls the position of the valve in relation to the fuel supply nozzle in a manner that is not affected by friction, by any spring or by lost motion. This is accomplished through the provision of a relatively stiff cam arm which is positively moved both inwardly as well as outwardly by adjusting screws.

It is a still further object of the present invention to provide a valve of such construction and arrangement that the fuel nozzle does not contact the cam arm during normal operation. That is to say, it is only in the event the mechanism is not being used at all and is in the "shut-off" condition that the cam may be in abutment with that nozzle.

It is a still further object of the present invention to provide a valve that will be under complete and positive control throughout the entire range of multiple adjustable positions. That is to say, a valve which will assume a natural slope or contour between each of the adjusting positions rather than an unnatural or distorted contour as has been true with many of the valves heretofore employed.

It is a still further object of the present invention to provide a valve which will require less power and, therefore, less expense to operate, these advantages flowing from the fact that the moving parts and the stationary parts are at a minimum thereby resulting in decreased friction losses.

The primary feature of the present invention resides in the construction and character of the cam arm and its adjusting screws whereby a positive two-way movement of the arm is made possible.

The full nature of the invention will be understood from the accompanying drawings and the following description and claims:

In the drawings Fig. 1 is an exploded view of the invention and its environment, the left-hand illustration being a side elevation view of the entire unit and the right-hand illustration being a front elevation of the air-inlet valve portion thereof.

Fig. 2 is a view looking into the housing which defines the mixing chamber after the removal of the air-inlet valve portion, showing the fuel nozzle in section and the curved valve arm and its adjusting screws.

Fig. 3 is a side elevation view of the mechanism, with a portion thereof being a transverse section view.

In the drawings the entire unit is shown generally at 10. It includes the base 11, and a motor 12 which drives a centrifugal fan (not shown) mounted in the casing 13. Extending tangentially from this casing is the conduit 14 which leads to the burner (not shown).

On the inlet side of the fan is the housing 15 for the fuel valve shown more particularly in Figs. 2 and 3. Leading to this housing is the fuel line 16. One outer face of the housing has an apertured cover plate 16a, immediately inside of which is mounted the rotatable and apertured shutter 17. By turning the handle 18 the size of the openings or inlets 19 may be varied at will to control the volume of air admitted to the housing. The handle hub 20 is connected to a stub shaft 21 which is journalled in the boss 22 of the fuel nozzle 23 having the port 24. Consequently by turning the handle the shutter is not only rotated in one direction or the other but so is the fuel nozzle as well, with a result which will hereinafter be described.

The adjustable fuel valve is shown in detail in Figs. 2 and 3. It is the heart of the invention. As will be observed therein, a plurality of arcuately spaced adjusting screws 25 is mounted in the peripheral wall 26 of the housing. Each screw is annularly reduced adjacent its inner end to form a groove within which is seated a yoke 27. This yoke has a central aperture 28, the defining edges of which envelop and nest within the groove. The opposite ends of each yoke are bent to form flanges 30, the free ends 31 of which are turned inwardly.

Within the opposed, free ends of each yoke is mounted the curved valve member or arm 32. A spring 33 envelops the inner end of the screw. One end of this spring is seated against and bears upon the adjacent and innermost face of the yoke. The opposite end of the spring bears upon the enlarged head 34 formed at the innermost end of each screw. (As is apparent, a pressure washer could be used instead of a spring). The curved arm or valve is suitably secured at one end as by the bolt 35 to the boss 36 formed on the inner peripheral surface of the housing.

As will be observed particularly from Figs. 2 and 3, the action of the adjusting screws and yokes upon the valve arm is a positive two-way action. This is to say, when the screw is turned inwardly the inner head 34 thereof positively moves the arm inwardly. On the other hand, when the screw is adjusted in the other direction the spring 33 bears upon the inner face of the yoke in such manner as to move it outwardly thereby moving the arm outwardly with it through the action of the inturned ends 31. Thus the adjusting screws positively and completely control the position of the arm relative to the orifice or port of the fuel nozzle, it being noted that the arm does not at any time while in use, contact the adjacent face of the fuel nozzle. When the valve is in use as distinguished from "shut-off" condition the arm will always be spaced anywhere from 1/16 to 1/4 of an inch away from the mouth of the nozzle.

In the Fig. 2 illustration the nozzle is shown in Station 1 where it is closest to the arm. The dotted lines in that same figure show the nozzle located at Stations 4 and 6, the distance separating the mouth of the nozzle and the arm being progressively greater as the nozzle is arcuately moved in what is shown as an upward direction in Fig. 2. As is readily understandable, the greater the distance separating the mouth from the arm the greater will be the volume of fuel admitted through the mouth of the nozzle. The opposite result quite naturally follows a decrease in the distance separating the arm and nozzle.

As is well known, there are many variables within burner systems for furnaces and the like which make necessary a change in the relative proportions of gas and air. Some of these variables are internal furnace pressure, frictional resistance in the air or fuel manifold pipe, changes in pressure at which combustion air is supplied and changes in pressure of fuel supply. In order to compensate for these variables it is necessary to provide for changes in the mixture that is fed to the burner. In connection with the present invention these changes are effected in a facile and easy manner. It is necessary only to adjust the screws either inwardly or outwardly at each of the six stations disclosed in order to increase or decrease the distance separating the mouth of the nozzle from the arm. With such increase or decrease the volume of gas flowing through the mouth of the nozzle is varied and controlled in relation to the size of the air-inlet openings 19.

For example, when the handle is in the position shown in Fig. 1 the shutters are in their open position thereby letting in a maximum amount of air. At such time the fuel nozzle is located at Station 1 as shown in Fig. 2. Should it be desired to increase the volume of fuel flowing from the nozzle in relation to the volume of air being sucked in by the centrifugal fan it is necessary only to adjust the screws. If it is desired to decrease the air inlet area the handle may be turned thereby automatically turning with it the fuel nozzle. As has heretofore been observed, as the nozzle is moved arcuately upwardly the distance separating it from the arm increases thereby resulting in an increase in the proportion of fuel to air. Any movement of the adjusting screw quite clearly results in a definite change in the nozzle opening and in a definite change in the volume of fuel in relation to the volume of air.

It is also apparent from the foregoing that because of the character of the arm, i. e. its relative stiffness, there is no distortion of it between stations or screws. That distortion or variation in the natural curve of the arm has characterized many of the valves in the prior art, and has obvious disadvantages. With the present invention, however, a natural uniform curve is preserved and multiple adjusting points are made possible.

Although the handle 18 is shown as manually operable in the drawings, it is obvious that automatic means may be employed to turn it to any desired position.

While the invention has been illustrated and described in great detail in the drawings and foregoing description, the same is to be considered as illustrative and not restrictive in character.

The invention claimed is:

1. In apparatus for proportioning the flow of gas and air to a burner system including a housing; a fuel nozzle mounted for movement along a predetermined path in said housing, an elongated valve mounted within said housing for controlling the flow of fuel from said nozzle and having its surface from one end to the other spaced progressively further from the path of movement of the outlet end of said nozzle, a plurality of inwardly and outwardly adjustable screws mounted in the peripheral wall of said housing and extending therethrough, and means connecting said screws and said valve for positive inward and outward movement of said valve in relation to said path of movement of said nozzle outlet as said screws are turned inwardly and outwardly.

2. In apparatus for proportioning the flow of gas and air to a burner system including a housing; a fuel nozzle mounted in said housing and extending radially relative to the axis thereof, said nozzle being movable to a multiplicity of selected stations, a curved valve arm of flexible character secured at one end within said housing, the surface of said arm from one end to the other being progressively further removed from the path traversed by the outlet end of said nozzle, a plurality of inwardly and outwardly adjustable elements mounted in the peripheral wall of said housing and extending therethrough, and means connecting said screws and said arm for positive inward and outward movement thereof in relation to said path traversed by the outlet end of said nozzle, said means including a yoke connected to and movable with each screw, a portion of said yoke embracing said arm.

3. In apparatus for proportioning the flow of gas and air to a burner system including a housing; a fuel nozzle mounted for movement along a predetermined path in said housing, a valve arm for said nozzle secured at one end within said housing and having its surface from said one end to the other end spaced progressively further from the path of movement of the outlet end of said nozzle, mounted in said housing and engageable at spaced intervals with a portion of said arm, for varying the proximity of said arm to the path of movement of the outlet end of said nozzle.

4. In apparatus for proportioning the flow of gas and air to a burner system including a housing; a fuel nozzle mounted for movement along a predetermined path in said housing, a valve arm mounted within said housing and extending radially relative to the axis thereof for controlling the flow of fuel from said nozzle, said arm being secured at one end within said housing and having its surface from one end to the other normally spaced progressively further from the path of movement of the outlet end of said nozzle, a plurality of inwardly and outwardly adjustable screws mounted through the peripheral wall of said housing and having enlarged inner ends, and means connecting said screws and said arm in relation to said outlet end, said means comprising a substantially U-shaped yoke having inturned ends embracing one face of said arm, said yoke being centrally apertured for mounting upon said screw, the enlarged end of said screw bearing upon the opposite face of said arm, and pressure exerting means interposed between said enlarged end and the adjacent face of said yoke.

5. In apparatus for proportioning the flow of gas and air to a burner system including a housing; a fuel nozzle mounted in said housing and having its outlet end movable along a predetermined curved path therewithin, a curved elongated flexible arm secured at one end within said housing, the surface of said arm from one end to the other being progressively further spaced from the path traversed by the outlet end of said nozzle for controlling the flow of fuel from said nozzle, and means mounted within said housing for varying the degree of progressive spacing between said arm and the outlet end of said nozzle.

References Cited in the file of this patent

UNITED STATES PATENTS

| | | |
|---|---|---|
| 1,175,881 | Creelman | Mar. 14, 1916 |
| 1,320,107 | Werlin | Oct. 28, 1919 |
| 1,988,945 | Hansen | Jan. 22, 1935 |
| 2,286,173 | Maxon | June 9, 1942 |